(12) United States Patent
Rissa et al.

(10) Patent No.: US 8,402,536 B2
(45) Date of Patent: Mar. 19, 2013

(54) SIGNATURE BASED AUTHENTICATION OF THE CONFIGURATION OF A CONFIGURABLE LOGIC COMPONENT

(75) Inventors: Terro Pekka Rissa, Siivikkalantie (FI); Seppo Tapio Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 866 days.

(21) Appl. No.: 12/104,096

(22) Filed: Apr. 16, 2008

(65) Prior Publication Data

US 2009/0260082 A1  Oct. 15, 2009

Related U.S. Application Data

(60) Provisional application No. 61/045,248, filed on Apr. 15, 2008.

(51) Int. Cl.
*G06F 21/00* (2006.01)
(52) U.S. Cl. ........... 726/22; 380/59; 713/187; 713/189
(58) Field of Classification Search .............. 726/17, 726/22; 713/187, 189; 380/59
See application file for complete search history.

(56) References Cited

U.S. PATENT DOCUMENTS

| 5,835,594 | A  | * | 11/1998 | Albrecht et al. ........... 713/187 |
| 6,654,889 | B1 |   | 11/2003 | Trimberger |
| 6,968,478 | B1 | * | 11/2005 | Edwards et al. ........... 714/32 |
| 7,278,128 | B1 | * | 10/2007 | Trimberger ........... 716/117 |
| 7,401,280 | B1 | * | 7/2008  | Singh et al. ........... 714/732 |
| 7,484,081 | B1 | * | 1/2009  | Langhammer et al. ........... 713/1 |
| 2003/0099358 | A1 | | 5/2003 | Michael et al. |
| 2007/0300207 | A1 | | 12/2007 | Booth et al. |

FOREIGN PATENT DOCUMENTS

| EP | 1 124 330 | 8/2001 |
| EP | 1 170 868 | 1/2002 |

OTHER PUBLICATIONS

Drimer, Saar; "Authentication of FPGA Bitstreams: Why and How," Reconfigurable Computing Architectures, Tools and Applications, Lecture Notes in Computer Science, 2007, Springer Berlin / Heidelberg, vol. 4419, pp. 73-84.*
MR Rieback, B Crispo, AS Tanenbaum, The Evolution of RID Security, As Tanenbaum—IEEE Pervasive . . . , 2006—rfidguardian.org.*
"IP Security in FPGAs," by Austin Lesea, Feb. 16, 2007, pp. 1-9.

* cited by examiner

*Primary Examiner* — Oscar Louie
*Assistant Examiner* — Ali Shayanfar
(74) *Attorney, Agent, or Firm* — Locke Lord LLP

(57) ABSTRACT

A configurable logic component is shown with a signature generator, responsive to a commanded configuration information signal from a processor, for providing a signed commanded configuration information signal, and with a memory device, responsive to the signed commanded configuration information signal from the signature generator, for storing the signed commanded configuration information signal in the configurable logic component for use by the processor in checking a current configuration of the configurable logic component against a trusted signed configuration file to ensure the current configuration matches the commanded configuration and allowing use of the configurable logic component in case of a match.

16 Claims, 3 Drawing Sheets

SIGNATURE BASED AUTHENTICATION OF THE CONFIGURATION OF A CONFIGURABLE LOGIC COMPONENT

CROSS-REFERENCE TO RELATED APPLICATION

This application claims priority from U.S. Provisional Application 61/045,248 filed Apr. 15, 2008.

TECHNICAL FIELD

This disclosure relates to a configurable logic component, to processing signals related to the component and to a related processor.

BACKGROUND

Programmable logic technology refers to electronic components with which it is possible to build digital circuits that are reconfigurable. Unlike a fixed array of logic gates which has a fixed function, a programmable logic device (PLD) usually has an undefined function at the time of manufacture or is at least capable of being changed in the field. Before the PLD can be used in a circuit it must be programmed, i.e., it must be configured. If circumstances change, it can later be re-configured.

Programmable logic has several desirable features that are unfortunately difficult to implement for mass market products using present ASIC (Application Specific Integrated Circuit), ASSP (Application Specific Standard Product), or SW (Software) technologies. Some of these are: low NRE (Non-Recurring Engineering) cost, field programmability, low latency, high data parallelism and throughput, early HW (Hardware) availability, and fast time-to-market.

Programmable logic devices have so far found limited use in portable consumer products due to their high unit cost and power consumption. However, economy and low-power component families have recently been introduced as suppliers are targeting the consumer market for growth. The market growth rate of programmable logic in the year 2006 was 12.5%, more than two times as high as the growth rate of other non-memory ICs (Integrated Circuits), which was 5.5%. Also, the projected growth rate for the 2008-12 time frame is higher than that of the overall IC market.

The most commonly referred to SRAM-based (Static Random Access Memory based) programmable logic components are Field Programmable Gate Arrays (FPGAs) and Complex Programmable Logic Devices (CPLDs). SRAM-based programmable logic, being volatile in nature, must be reprogrammed every time the device has lost its operating voltage. A great body of work has been put into ensuring that this configuration can't be altered by a third party as a result of a malicious attack. For example, the Digital Rights Management (DRM) specification may dictate that certain data cannot be allowed to be directed into digital output. In such a case, for instance, a programmable logic device could be maliciously reprogrammed to direct a datastream meant for digital to analog conversion (to be listened to with headphones) to instead store the data digitally, thus circumventing the DRM protection and leading to possibly very large monetary losses due to unauthorized replication, sale, or both. As another a more sinister example, a programmable logic device that is used for controlling the energy and power management circuitry in a portable device could be maliciously reprogrammed to cause the device's battery to explode. As exploding batteries can lead to great harm to persons and further to multi-million recalls or compensation claims, this could be done purposefully by a person or group with malicious intent. More subtle mal-configurations can be imagined with repairs required and damage to the reputation of the manufacturer or service provider. Furthermore, since the volatile programmable device will lose its configuration when losing its operating voltage, in that event the evidence of the malicious configuration is lost as well.

SUMMARY

An object hereof is to enable detection of an unauthorized reconfiguration of a programmable logic component.

According to a first embodiment, a method is provided, comprising:
retrieving a signed configuration information signal stored on a configurable logic component and indicative of a commanded configuration of said configurable logic component for comparison with a trusted signed configuration information signal also indicative of said commanded configuration, and
allowing use of said configurable logic component configured according to said commanded configuration in case said signed configuration information signal matches said trusted signed configuration information signal.

In further accord with the first embodiment, the provided method may further comprise storing said trusted signed configuration information signal outside said configurable logic component.

Further still in accord with the first embodiment, the provided method may further comprise generating said trusted signed configuration information signal inside said configurable logic component.

According still further with the first embodiment, the provided method may further comprise retrieving said trusted signed configuration information signal generated inside said configurable logic component for said storing said trusted signed configuration information signal outside said configurable logic component.

According to a second embodiment, a method is provided, comprising:
receiving, in a configurable logic component, a commanded configuration information signal from a processor for configuring said configurable logic component into a commanded configuration,
signing said commanded configuration information signal in said configurable logic component for providing a signed commanded configuration information signal, and
storing said signed commanded configuration information signal in said configurable logic component.

In further accord with the second embodiment, the provided method may further comprise:
retrieving said signed commanded configuration information signal stored in said configurable logic component for comparison with a trusted signed configuration information signal also indicative of said commanded configuration, and
allowing use of said configurable logic component configured according to said commanded configuration in case said signed commanded configuration information matches said trusted signed configuration information signal.

Further still in accord with the second embodiment, the provided method may further comprise storing said trusted signed configuration information signal outside said configurable logic component.

According still further with the second embodiment, the provided method may further comprise generating said trusted signed configuration information signal inside said configurable logic component.

According to a third embodiment, apparatus is provided, comprising a processor configured:
- to compare a signed configuration information signal indicative of a commanded configuration of said configurable logic component and stored on a configurable logic component to a trusted signed configuration information signal also indicative of said commanded configuration; and
- to allow, in case of a match between said signed commanded configuration information signal and said trusted signed configuration information signal, use of said configurable logic component configured in said commanded configuration according to said configuration information.

In further accord with the third embodiment, the provided apparatus may further comprise said configurable logic component, said configurable logic component comprising:
- a signature generator, responsive to said commanded configuration information signal, for providing said signed commanded configuration information signal; and
- a special register, responsive to said signed configuration information signal, for storing said signed configuration information in said special register in said configurable logic component.

According to a fourth embodiment, apparatus is provided, comprising:
- a signature generator, responsive to a commanded configuration information signal from a processor, for providing a signed commanded configuration information signal; and
- a memory device, responsive to said signed commanded configuration information signal from said signature generator, for storing said signed commanded configuration information signal in said configurable logic component for use by said processor in checking a current configuration of said configurable logic component.

In further accord with the fourth embodiment, the provided apparatus may further comprise said processor, said processor configured:
- to retrieve said signed commanded configuration information signal stored in said memory device for comparison with a trusted signed configuration information signal; and
- to allow use of said configurable logic component configured according to said commanded configuration in case said signed configuration information signal matches said trusted signed commanded configuration information signal retrieved from said memory device.

Further still in accord with the fourth embodiment, said processor may be configured to store said trusted signed configuration information signal outside said configurable logic component.

In still further accord with the fourth embodiment, said processor may be configured to obtain said trusted signed configuration information from said configurable logic component.

The present disclosure is based on the realization that it would be very important to be able to detect ex post facto that an unauthorized reconfiguration has in fact occurred. The manufacturer would then be able to permit the device to be disabled or to be reconfigured to remove the unauthorized re-configuration which may have installed malicious functionality or to take some other appropriate action. A checking operation can be executed periodically and the configurable logic component allowed to continue operation if the configurable logic component continues to appear to be configured in the commanded configuration (as evidenced by a match between the signed commanded configuration signal and the trusted signed configuration signal).

Thus, a teaching hereof is to verify that the configuration of for instance the FPGA is what it should be, i.e., that no one has overwritten the configuration without authorization.

According to the teachings hereof, for a portable device such as a mobile phone, has a trusted programmable logic configuration file located in the (mobile) device memory. Such a device may without limitation and by way of example only be equipped with a programmable logic component that has a programming input, a signature generator, a special register that can be written only by the signature generator and by no other means (excluding possibly power-on reset), and an output for reading the special register. The processing unit may be connected to the output of the programmable logic component.

The proposed method may use cryptographic hash functions that cannot be hacked with any simple method.

In embodiments hereof, if non-volatile keys are already present in the application engine they may be used.

The present teachings can be used for instance to detect malicious reconfiguration of an SRAM-based programmable device.

Other objects and features will become apparent from the following detailed description considered in conjunction with the accompanying drawings.

DETAILED DESCRIPTION OF EMBODIMENTS

Figure 1:
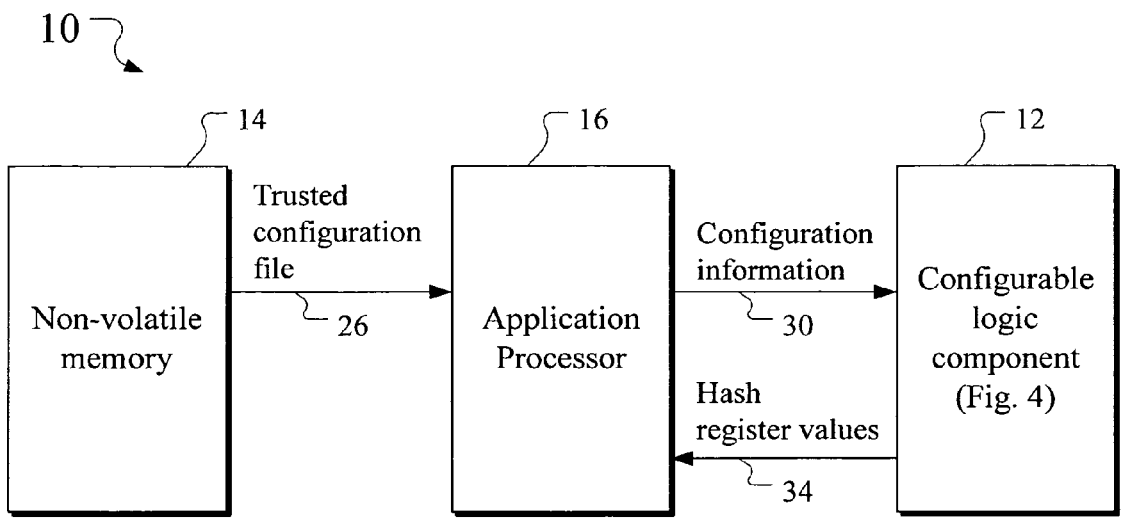
FIG. 1 shows a portable device with a setup according to an embodiment.

FIG. 1 illustrates an embodiment by showing an apparatus 10 setup in a combination of components that may be used for instance in a mass-marketed electronic device, such as in a portable device (e.g., mobile phone), to detect an unauthorized and perhaps malicious re-configuration of a configurable logic component 12. The apparatus 10 may also include a non-volatile memory 14 and an application processor 16.

In the setup according to this embodiment, a trusted programmable logic configuration file is stored in the non-volatile memory 14 of the portable device (e.g., mobile phone). The trusted programmable logic configuration file can be stored into the device memory 14 at manufacturing time or later. The trusted configuration file may be encrypted. The trusted configuration file may be transmitted to the portable device using a secure protocol. For a mobile phone embodiment, the file may be received over a wireless link. Using this setup, an encrypted and signed programmable logic configuration file may be stored using the same infrastructure by which software is stored, i.e., it can be assumed that the starting point is that an authenticated and encrypted configuration file is located in the portable device's non-volatile memory.

Figure 4:
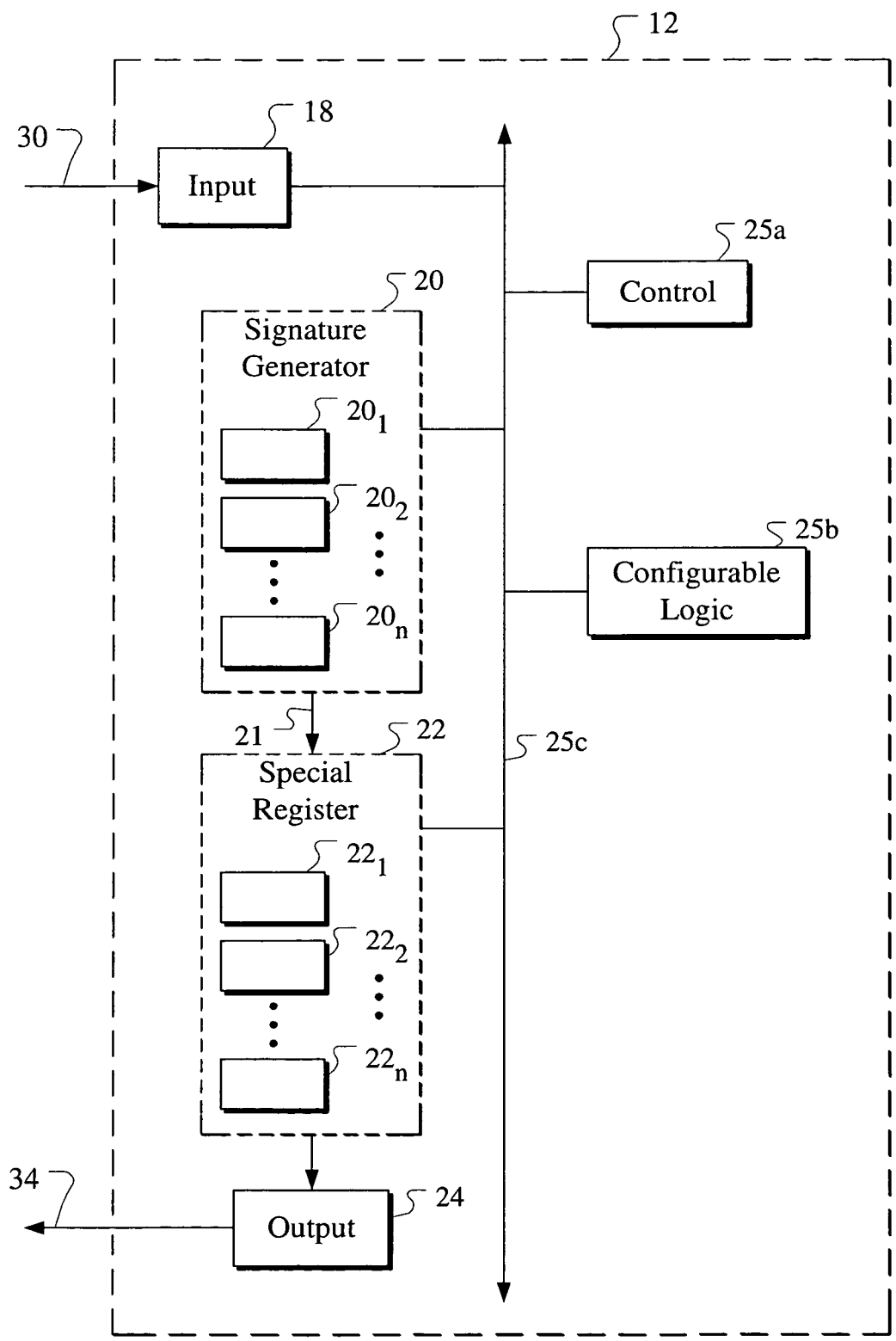
FIG. 4 shows an example of the configurable logic component of FIG. 1 in more detail.

As shown in FIG. 4, the programmable logic component 12 has a programming input 18, a signature generator 20 (which may be a known hash function or some other suitable algorithm), a special register 22 that can be written only by the signature generator and by no other means (excluding possibly power-on reset), and an output 24 for reading the special register 22. The signature generator signs each new configuration command signal received by the input 18 and stores the signed commanded configuration signal in the special register 22. There may be more than one signature generator as shown by a plurality of signature generators $20_1, 20_2, \ldots, 20_n$. There may be more than one special register as shown by a plurality of special registers $22_1, 22_2, \ldots, 22_n$. This is to provide for the possibility that there may be several signatures that may be calculated separately for different, possibly overlapping sections of the configuration information and may be stored in different special registers. In particular, one register could hold a signature based on the last configuration operation and another register could hold a signature based on all configuration information since the most recent power-up. In order to have the special register in a known initial state, it may be reset in power-up or its state may be read by the processing unit before programming.

It is noteworthy that the configurable logic component 12 does not have to have any encryption keys in it. Instead, it has at least one special register 22 which may take the form, for instance, of one or two special read-only registers. In this example, a first register would be hard-coded to have signature value (such as MD5, SHA-1, or SHA-3 in the future) of a PREVIOUS RECONFIGURATION (PR) and a second register would have the signature value of RECONFIGURATION HISTORY (RH) since the last power-up of the device. A particular device may have one or both of these registers and an actual hash function may be fixed to a single signature function or changeable during the power-on time of the device.

In the configurable logic component 12, there may be one or more hash-function hardware blocks 20 in parallel with configuration control 25a and configurable logic 25b. In such a scenario, for example, each hash code generator computes a hash code from all configuration data and cannot be disabled. The hash-function blocks update the PR and RH registers every time a configuration has taken place. The hardware is implemented in a way that no alternative sequence of events is possible. Existing configurable logic components such as programmable logic devices already have centralized configuration control 25a, so addition of the hash-blocks is simple. Also, hardware IP for these blocks is abundantly available. The programmable logic device provides READ ONLY access to the PR and RH registers.

In summary, the apparatus 12 of FIG. 4 comprises an input device 18, responsive to a commanded configuration information signal 30 from a processor 16 for configuring a configurable logic component thereof (such as logic 25b). The commanded configuration information signal may be provided on an internal bus 25c vis the input 18 to the control 25a which then configures the logic 25b according to the commanded configuration. The apparatus also includes a signature generator 20, also responsive to the commanded configuration information signal on the line 30 from the processor 16, for providing a signed (e.g. hashed) commanded configuration information signal on a line 21 (or on the bus 25c) indicative of (but not the same as) the commanded configuration information signal on the line 30. The memory device 22 is also included, responsive to the signed commanded configuration information signal from the signature generator, for storing the signed commanded configuration information signal in the configurable logic component 12 for use by the processor 16 in checking a current configuration of the configurable logic component 12.

In the illustrated embodiment of FIGS. 1 and 4, the processor 16 is directly connected to both the input 18 and the output 24 of the programmable logic component 12 but it should be realized that this might not necessarily be the case. They may be coupled together through intermediary devices.

Figure 2:
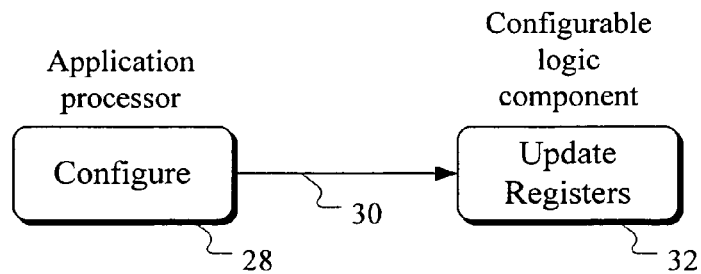
FIG. 2 shows a configuration flow diagram according to an embodiment.

The programmable logic component 12 may be programmed via the configuration input 18 at power-up or later with information derived from the configuration file that may be stored on the non-volatile memory 14. This is shown by way of example in FIG. 2. After receipt of the trusted configuration file on a line 26 a configuration step 28 is carried out by the processor 16. The processor 16 may include an application engine that can decrypt the configuration file using a common framework used for other encrypted files, i.e., using a protected application in a secure mode. At the end of this procedure, the configuration file is in CLEAR TEXT format in the volatile memory of the portable device.

The sending of a configuration command information signal is shown on a line 30 which is used by the configurable logic component 12 to configure the configurable logic component into the commanded configuration and, by means of the signature generator 20, to carry out an update 32 of the special register (or registers) 22 so that the special register 22 contains a signed commanded configuration signal indicative of the commanded configuration. The configuration operation itself may address the whole of the programmable logic component 25b or part of it.

Figure 3:
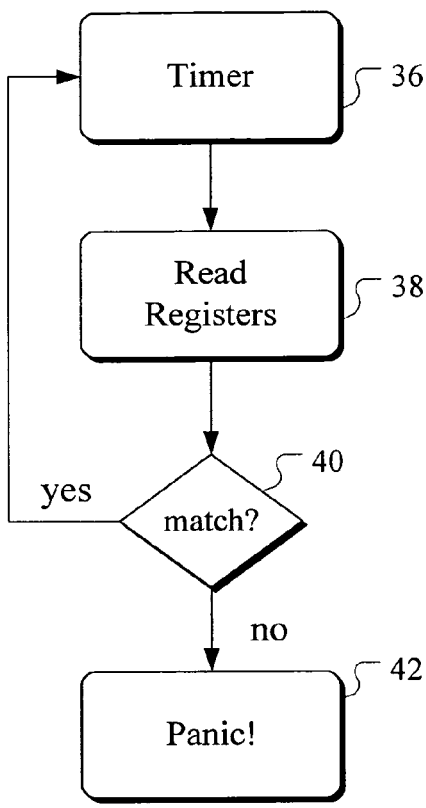
FIG. 3 shows a flow diagram to detect an unauthorized and perhaps malicious configuration according to an embodiment.

Thereafter, as shown in FIG. 3, as a way to check the integrity of the configurable logic component to make sure it has an authorized configuration, the processor 16 may read the value or indication of the special register 22 on a line 34 and compare it (a signed commanded configuration signal) with a signature that is trusted to correspond to the information that had previously been written by the processor 16 into the configuration input 18 (a trusted signed configuration information signal). The trusted signature may be encrypted. The trusted signature may be stored into the device memory 14 at manufacturing time or later. If later, the processor 16 may obtain a trusted signature by calculating it internally. Or the processor 16 can obtain the trusted signature by reading it from the special register 22 immediately after programming the logic component 12. The checking of FIG. 3 may be done periodically as shown by a timer step 36 waiting for a set time or event before again reading 38 an indication of the special register 22 on the line 34. If there is a correct match, the configurable logic component 12 is allowed to continue operation in its current configuration which is assumed to be the commanded configuration because of the correct match.

As an example of an event driven checking, the processor 16 may for instance keep track of the one or both of the values that should be in the configurable logic component's PR and RH registers 22 at any given time. Every time an authenticated bitstream is written into the configurable logic component 12, the application processor 16 checks that the signature of the configuration file that is retrieved from the special register 22 has remained unchanged, and updates its internal record of PR and RH values. For a periodic checking, using for example the value of the timer 36, the application processor checks that its record of the PR and RH registers matches the one in the configurable logic component 12. If there is a mismatch, security can be assumed to be compromised and selected security measures can be taken, for example reset of the configurable logic device, reconfiguration thereof, shutdown of the phone, locking of the phone, etc.

Thus, after a reading of the register or registers in the step 38, a comparison step 40 is carried out to compare the signal value or values read from the special register 22 with a signal value or values stored by the processor 16. If there is a match then it may be assumed that the configuration has not been changed without authorization and is configured as it should be. If there is not a match then corrective steps 42 may then be taken. By enabling detection of an unauthorized re-configuration after the fact, the teachings hereof permit rectification by for instance yet another re-configuration from the trusted configuration file or shutdown or some other appropriate action in the step 42. Thus, for the case that the processor 16 detects a signature mismatch at step 40, indicating that security may have been compromised, it may reprogram the logic component or take other measures, for example, cause the device to be locked or re-initialized. By reading the value of the special register multiple times, i.e., repeatedly at regular intervals, the processor is able to assume a "security watchdog" function. It should be understood that the tasks of the processor described above may be performed by one or more processors. The main point of steps 38 and 40 of FIG. 3 is to show retrieval of signed configuration information stored on a configurable logic component for comparison with trusted signed configuration information, and allowing continued use of the configurable logic component configured according to the configuration information in case the signed configuration information matches the trusted signed configuration information.

It will be understood by any person of skill in the art that the process described in FIG. 3 may be carried out in any number of different ways by hardware, software, or any combination of hardware and software. For instance, if the processor 16 is a general purpose signal processor, it might include a central processing unit (CPU) connected by data, address, and control signal lines to one or more memory devices such as a read only memory (ROM), a random access memory (RAM), or both, as well as to an input/output device. Executable software resident on the ROM may be accessed by the CPU to execute the functions described for instance in connection with FIG. 3. This is but a simple example of only one way to carry out the signal processing functions disclosed herein as will be evident to anyone of skill in the art.

Figure 5:
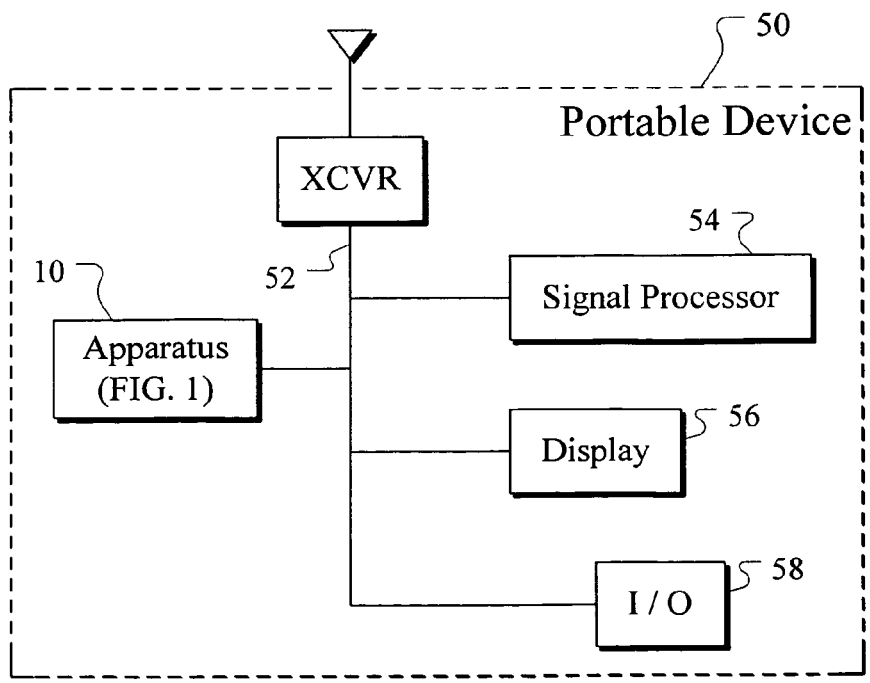
FIG. 5 shows a potable device such as a mobile phone in which an apparatus such as shown in FIG. 1 is embodied or in which selected components shown in FIG. 1 are embodied.

FIG. 5 shows a portable device 50 such as a mobile phone in which an apparatus 10 such as shown in FIG. 1 is embodied or in which selected components shown in FIG. 1 are embodied. The apparatus 10 may for instance be connected via an internal bus 54 to other components of the portable device such as a signal processor 54, a display 56, and other user input/output devices 58.

The invention claimed is:

1. A method, comprising:
    determining to pass by an apparatus, to a configurable logic component, a configuration command signal, wherein the configuration command signal configures said configurable logic component into a commanded configuration;
    generating by the apparatus, via a signature generator, a signature of the configuration command signal;
    storing by the apparatus, in a last reconfiguration register, said generated configuration command signal signature;
    updating by the apparatus via a signature generator, in accordance with the configuration command signal, a historical signature, wherein the historical signature is based on all configuration command signals passed by the apparatus to the configurable logic component since a most recent power-up, and wherein the historical signature is stored in a reconfiguration history register;
    performing one or more of:
        checking for match between:
            a last reconfiguration value record, stored in a non-transitory memory outside the configurable logic component, and
            a generated configuration command signal signature stored in the last reconfiguration register; and
        checking for match between:
            a reconfiguration history value record stored in the non-transitory memory outside the configurable logic component, and
            a historical signature stored in the reconfiguration history register; and
    allowing by the apparatus, where the one or more performed checks yield match, continued operation of said configurable logic component.

2. The method of claim 1, wherein one or more of said registers is write-restricted.

3. The method of claim 1, wherein one or more of said generating the signature of the configuration command signal and said updating of the historical signature employs hash function.

4. The method of claim 1, wherein the last configuration value record in the non-transitory memory outside the configurable logic component is one of stored in the non-transitory memory at a time of manufacture, calculated by at least one processor outside the configurable logic component, and stored in the non-transitory memory following said passing of the configuration command signal to the configurable logic component.

5. The method of claim 1, wherein said checks are performed with said passing of the configuration command signal or in accordance with a timer.

6. An apparatus, comprising:
    at least one processor; and
    at least one memory including computer program code, the at least one memory and the computer program code configured to, with the at least one processor, cause the apparatus at least to:
    determine to pass by the apparatus, to a configurable logic component, a configuration command signal, wherein the configuration command signal configures said configurable logic component into a commanded configuration;
    generate by the apparatus, via a signature generator, a signature of the configuration command signal;
    store by the apparatus, in a last reconfiguration register, said generated configuration command signal signature;
    update by the apparatus via a signature generator, in accordance with the configuration command signal, a historical signature, wherein the historical signature is based on all configuration command signals passed by the apparatus to the configurable logic component since a most recent power-up, and wherein the historical signature is stored in a reconfiguration history register;
    perform one or more of:
        check for match between:
            a last reconfiguration value record, stored in a non-transitory memory outside the configurable logic component, and
            a generated configuration command signal signature stored in the last reconfiguration register; and
        check for match between:

a reconfiguration history value record stored in the non-transitory memory outside the configurable logic component, and a historical signature stored in the reconfiguration history register; and allow by the apparatus, where the one or more performed checks yield match, continued operation of said configurable logic component.

7. The apparatus of claim 6, wherein one or more of said registers is write-restricted.

8. The apparatus of claim 6, wherein one or more of said generating the signature of the configuration command signal and said updating of the historical signature employs hash function.

9. The apparatus of claim 6, wherein the last configuration value record in the non-transitory memory outside the configurable logic component is one of stored in the non-transitory memory at a time of manufacture, calculated by the at least one processor outside the configurable logic component, and stored in the non-transitory memory following said passing of the configuration command signal to the configurable logic component.

10. The apparatus of claim 6, wherein said checks are performed with said passing of the configuration command signal or in accordance with a timer.

11. An apparatus, comprising:
a configurable logic component, wherein the configurable logic component comprises:
  at least one signature generator;
  a last reconfiguration register; and
  a reconfiguration history register;
at least one processor outside the configurable logic component; and
a non-transitory memory outside the configurable logic component,
wherein the at least one processor is configured to determine to pass to the configurable logic component a configuration command signal, wherein the configuration command signal configures said configurable logic component into a command configuration,
wherein the at least one signature generator is configured to generate a signature of the configuration command signal,
wherein the last reconfiguration register is configured to store said generated configuration command signal signature,
wherein said at least one signature generator is configured to update, in accordance with the configuration command signal, a historical signature, wherein the historical signature is based on all configuration command signals passed by the at least one processor to the configurable logic component since a most recent power-up, and wherein the historical signature is stored in the reconfiguration history register,
wherein the at least one processor is configured to perform one or more of:
  checking for match between:
    a last reconfiguration value record stored in the non-transitory memory outside the configurable logic component, and
    a generated configuration command signal signature stored in the last configuration register, and
  checking for match between:
    a reconfiguration history value record stored in the non-transitory memory outside the configurable logic component, and a historical signature stored in the reconfiguration history register, and
  wherein the at least one processor is configured to allow, where the one or more performed checks yield match, continued operation of the configurable logic component.

12. The apparatus of claim 11, wherein one or more of said registers is write-restricted.

13. The apparatus of claim 11, wherein one or more of said generating the signature of the configuration command signal and said updating of the historical signature employs hash function.

14. The apparatus of claim 11, wherein the last configuration value record in the non-transitory memory outside the configurable logic component is one of stored in the non-transitory memory at a time of manufacture, calculated by the at least one processor outside the configurable logic component, and stored in the non-transitory memory following said passing of the configuration command signal to the configurable logic component.

15. A programmable logic component, comprising:
at least one signature generator;
a last reconfiguration register; and
a reconfiguration history register,
wherein the programmable logic component receives a configuration command signal, wherein the configuration command signal configures said programmable logic component into a command configuration,
wherein the at least one signature generator is configured to generate a signature of the configuration command signal,
wherein the last reconfiguration register is configured to store said generated configuration command signal signature,
wherein said at least one signature generator is configured to update, in accordance with the configuration command signal, a historical signature, wherein the historical signature is based on all configuration command signals received at the programmable logic component since a most recent power-up, and wherein the historical signature is stored in the reconfiguration history register, and
wherein the programmable logic component is allowed to continue operation where one or more of:
  performed check yields match between:
    a generated configuration command signal signature stored in the last reconfiguration register, and
    a non-transitory memory-stored last reconfiguration value record; and performed check yields match between:
    a historical signature stored in the reconfiguration history register, and a non-transitory memory-stored reconfiguration history value record.

16. An apparatus, comprising:
at least one outside-configurable-logic-component processor; and
an outside-configurable-logic-component non-transitory memory,
wherein the at least one processor is configured to determine to pass a configurable logic component configuration command signal, wherein said configuration command signal causes configuration into a commanded configuration, wherein there is a configurable logic component last configuration register-stored generated signature of said configuration command signal, and wherein there is a configurable logic component reconfiguration history register-stored updated historical signature which is in accordance with said configuration command signal, wherein said historical signature is based on all configuration command signals passed by the apparatus since a most recent power-up, wherein the at least one processor is configured to perform one or more of:

checking for match between:

a last reconfiguration value record stored in the non-transitory memory, and a configurable logic component last configuration register-stored configuration command signal signature, and checking for match between:

a reconfiguration history value record stored in the non-transitory memory, and a configurable logic component reconfiguration history register-stored historical signature, and wherein the at least one processor is configured to allow, where the one or more performed checks yield match, continued configurable logic component operation.

* * * * *